Aug. 18, 1964 H. L. LAQUER 3,145,284

SUPERCONDUCTIVE ELECTRIC SWITCH

Filed Oct. 2, 1962

INVENTOR.
Henry L. Laquer
BY
Roland A. Anderson
Attorney

United States Patent Office 3,145,284 Patented Aug. 18, 1964

3,145,284

SUPERCONDUCTIVE ELECTRIC SWITCH

Henry L. Laquer, Espanola, N. Mex., assignor to the United States of America as respresented by the United States Atomic Energy Commission Filed Oct. 2, 1962, Ser. No. 227,967
2 Claims. (Cl. 200—166)

This invention relates to electric switches and more specifically to electric switches to be utilized with superconducting circuitry.

The problem of electrical switching in superconducting apparatus arises from a number of circumstances, including the fact that it is often necessary to switch currents of thousands of amperes. It is necessary that the conductivity of the switch when closed be exceedingly high, i.e., that the resistance be exceedingly low, preferably less than $10^{-10}$ ohms. On the other hand, the "open" resistance only needs to be higher than the "closed" resistance by a factor of 1000 or more and this includes $10^{-6}$ ohms, the resistance of a short piece of normal metal wire as compared to the immeasurably low resistance of the same metal wire in the superconducting state. It is apparent, therefore, that the contact resistance of the usual make-break switch makes this type of switch not applicable. In addition, it is desirable that switches utilized in superconducting circuits be directly connected in the coolant bath or cryostat with the remaining apparatus, thereby avoiding, insofar as possible, joints or contacts and eliminating the necessity for conductors of normal conductivity which would necessarily be very large, cumbersome and heat-conducting.

Figure 1:
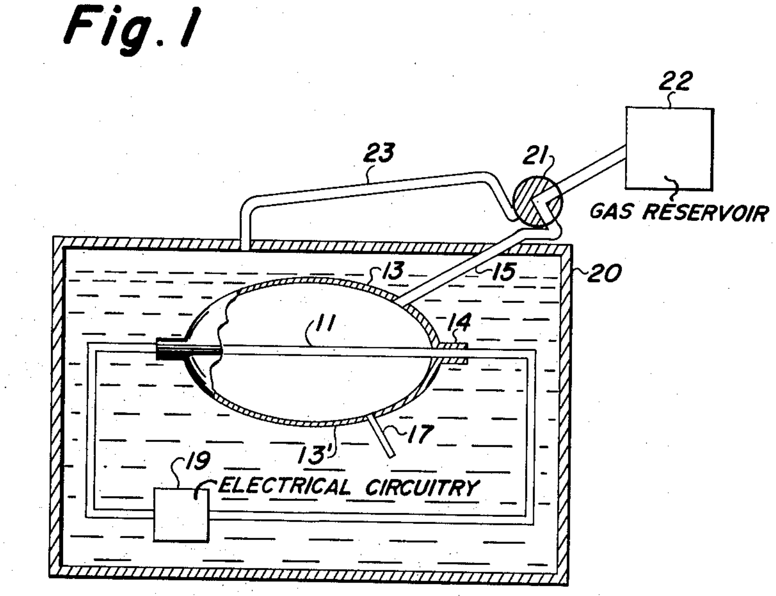
Figure 2:
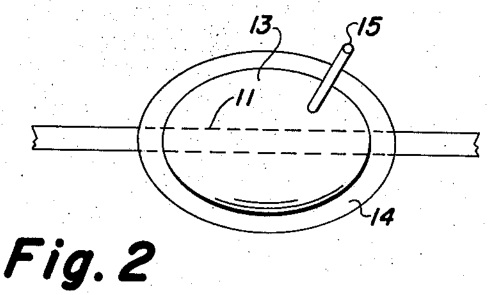

It is, accordingly, an objective of the present invention to provide an electrical switch for use in superconducting circuitry which avoids the foregoing difficulties. The obtaining of this objective and other advantages appertaining to the switch of the present invention will become apparent from the following description in which FIGURE 1 is a vertical cross section of the switch of the present invention and FIGURE 2 is a perspective view of the exterior of the switch.

The switch of the present invention comprises a conductor 11 of material which has superconducting properties. A number of such materials are available, such as niobium, indium, niobium-zirconium and more particularly $Nb_3Sn$. A shell-like container 13–13' surrounds a portion of strip 11 and is hermetically sealed therewith. An inlet duct 15 having an internal diameter of about 0.1 inch communicates with the upper wall of container 13–13' and a second duct 17 of smaller diameter (about 0.05 inch) communicates with the bottom wall of the container. For effective exclusion of coolant during "off" switching this duct must have an appreciable length and although the exact length is not critical, I have found about three inches in length to be satisfactory. The switch, along with related circuitry 19, is submersed in a coolant, preferably liquid helium, in cryostat 20, shown schematically. The coolant is held at a temperature below the superconducting transition temperature. $Nb_3Sn$ has a transition temperature in the neighborhood of 18° K. but it is preferable to operate the apparatus at a temperature of between 2° K. and 4° K. Under these conditions the conductor 11 is superconducting when container 13 is filled with the coolant. When it is desired to "open" the circuit, valve 21 is rotated so that the warm helium gas reservoir 22, at a pressure above that of the bath, communicates with duct 15 to expel the liquid coolant from container 13 and to warm conductor 11 to above the transition temperature. In general, the switching action can be triggered in less than a second and upon restoration of valve 21 to communicate duct 15 with duct 23 at cryostat pressure the switch returns to the superconducting state in from 5 to 10 seconds.

Container 13 may be of any impermeable non-superconducting substance and copper particularly has desirable properties such as ease in fabrication and solderability. The container is conveniently made of two halves, i.e., a top and bottom half, each of dished-shape with a peripheral flange 14. The halves are positioned with flanges contacting and conductor 11 passing therethrough. The contacting flanges are then sealed together as by soldering.

Conductor 11 preferably has a cross-sectional shape which is effective for heat transfer. As shown, it is of ribbon shape thus having a large surface area compared to cross-sectional area. Other expedients for enhancing heat transfer may be utilized, such as heat-conducting fins affixed to the surface of superconducting ribbon 11.

The container or shell 13–13' may be of other shapes and of other materials than copper. It may, for example, be of bellows shape or even cylindrical, provided it is flexible enough to minimize stresses from differential thermal expansion of the materials used.

What is claimed is:

1. An electrical switch for superconducting apparatus comprising a conductor of superconducting material and an enclosing shell, said shell comprising two dish-shaped components having rim flanges and supported symmetrically about a portion of said conductor of superconducting material with the rim flanges affixed to and sealed with the conductor and to each other, means for admitting coolant having a temperature below the transition temperature of said superconducting material into said shell in contact with said conductor to render the same superconducting and means for admitting a gas having a temperature above the transition temperature of the superconducting material into said shell to expel the coolant therefrom to render the switch non-superconducting.

2. The superconductive electric switch of claim 1 in which the superconducting material is $Nb_3Sn$, the coolant is helium liquid at about 4° K. and the gas is helium above about 19° K.

References Cited in the file of this patent

UNITED STATES PATENTS 3,048,707 Nyberg ---------------- Aug. 7, 1962